(12) United States Patent
Zheng et al.

(10) Patent No.: US 11,706,498 B2
(45) Date of Patent: Jul. 18, 2023

(54) PLAYBACK METHOD, SYSTEM, DEVICE AND READABLE STORAGE MEDIUM OF LIVE BROADCAST CONTENT

(71) Applicant: SHANGHAI BILIBILI TECHNOLOGY CO., LTD., Shanghai (CN)

(72) Inventors: Nanling Zheng, Shanghai (CN); Jun Jiang, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/533,914

(22) Filed: Nov. 23, 2021

(65) Prior Publication Data
US 2022/0167063 A1 May 26, 2022

(30) Foreign Application Priority Data

Nov. 26, 2020 (CN) .......................... 202011344944.2

(51) Int. Cl.
*H04N 21/2187* (2011.01)
*H04N 21/231* (2011.01)
*H04N 21/2387* (2011.01)
*H04N 21/433* (2011.01)
*H04N 21/472* (2011.01)
*H04N 21/845* (2011.01)
*H04N 21/6587* (2011.01)
*H04N 21/2183* (2011.01)
*H04N 21/239* (2011.01)

(52) U.S. Cl.
CPC ..... *H04N 21/6587* (2013.01); *H04N 21/2183* (2013.01); *H04N 21/2393* (2013.01); *H04N 21/8456* (2013.01)

(58) Field of Classification Search
CPC .................................................. H04N 21/6587
See application file for complete search history.

(56) References Cited

U.S. PATENT DOCUMENTS

2017/0171341 A1* 6/2017 Zane ................. H04N 21/23439
2020/0413117 A1* 12/2020 Loheide ............. H04N 21/2187

FOREIGN PATENT DOCUMENTS

| CN | 103747285 A | 4/2014 |
| CN | 104168516 A | 11/2014 |
| CN | 104410879 A | 3/2015 |
| CN | 105898586 A | 8/2016 |
| CN | 107948669 A | 4/2018 |
| WO | WO 2018/076998 A1 | 5/2018 |

* cited by examiner

*Primary Examiner* — Hsiungfei Peng
(74) *Attorney, Agent, or Firm* — BakerHostetler

(57) ABSTRACT

The present application discloses techniques for playback of live broadcast content. The techniques comprise receiving a request of playing live broadcast content from a client computing device, wherein the request comprises information indicating a first address associated with the live broadcast content, and the request further comprises a playback time parameter indicating a playback time length; generating a second address based on a current system time parameter, the first address, and the playback time parameter; obtaining live broadcast content based on the second address and transmitting the live broadcast content to the client computing device.

17 Claims, 4 Drawing Sheets

PLAYBACK METHOD, SYSTEM, DEVICE AND READABLE STORAGE MEDIUM OF LIVE BROADCAST CONTENT

CROSS-REFERENCE TO RELATED APPLICATION

The present application declares priority of the Chinese patent application with number CN 202011344944.2, file on Nov. 26, 2020, entitled "playback method, system, device and readable storage medium of live broadcast content". Entire content of the Chinese patent application is incorporated in the present application by reference.

BACKGROUND

In live broadcast scenes, when watching a live video, users are prone to encounter the following problems: missing highlights while watching a match live broadcast and wanting to playback, missing a song that they want to listen to while watching an entertainment live broadcast and wanting to playback, and missing an anchor's pass while watching a game live broadcast and wanting to playback, and being not understanding technical points when watching a technical speech live broadcast and wanting to playback. It can be seen that users have a great demand for live playback, but in the existing live broadcast technology, the function of playing back live broadcast content cannot be realized in the live broadcast process, causing inconvenience to users and poor user experience.

SUMMARY

The purpose of the present application is to provide a playback method, a system, a device, and a readable storage medium of live broadcast content, which can achieve the effect that the user can pull a playing progress bar at any time during the process of watching live broadcast to playback the previous live broadcast content.

According to one aspect of the present application, a playback method of live broadcast content applied to an edge server computing device (edge server) in a content delivery network (CDN) is provided, and the method includes: receiving a playing request sent by a user terminal; wherein the playing request includes a first playing address and a playback time parameter; obtaining a current system time parameter, and forming a second playing address according to the current system time parameter, the first playing address and the playback time parameter; obtaining live broadcast content corresponding to the second playing address, and sending the live broadcast content to the user terminal.

Optionally, the playing request is an http request that can be opened on an HTML5 page. Optionally, after the receiving a playing request sent by a user terminal, the method further includes: determining whether the playback time parameter is included in the playing request; if not, setting the playback time parameter to be zero.

Optionally, the forming a second playing address according to the current system time parameter, the first playing address and the playback time parameter specifically includes: taking difference between the current system time parameter and the playback time parameter as an absolute time parameter, and forming the second playing address including the absolute time parameter and the first playing address.

Optionally, the obtaining live broadcast content corresponding to the second playing address, and sending the live broadcast content to the user terminal, includes: obtaining a segment index file corresponding to the second playing address, and sending the segment index file to the user terminal; wherein the segment index file includes index information of a plurality of video segment files; receiving a segmentation request sent by the user terminal; wherein the segmentation request includes index information; obtaining a video segment file corresponding to the index information, and sending the video segment file to the user terminal.

Optionally, the obtaining a segment index file corresponding to the second playing address, and sending the segment index file to the user terminal, specifically includes: determining whether the segment index file corresponding to the second playing address is existed in a local cache; if yes, sending the segment index file in the local cache to the user terminal; if not, obtaining the segment index file corresponding to the second playing address from an origin server computing device (origin server) in the CDN, storing the segment index file in the local cache and sending the segment index file to the user terminal.

Optionally, the obtaining a segment index file corresponding to the second playing address, specifically includes: parsing out the absolute time parameter contained in the second playing address; obtaining the segment index file whose file name includes the absolute time parameter.

Optionally, the obtaining a segment index file corresponding to the second playing address, and sending the segment index file to the user terminal, specifically includes: determining whether the video segment file corresponding to the index information is existed in a local cache; if yes, sending the video segment file in the local cache to the user terminal; if not, obtaining the video segment file corresponding to the index information from an origin server in the CDN, storing the video segment file in the local cache and sending the video segment file to the user terminal.

In order to achieve the above objectives, the present application further provides a playback method of live broadcast content applied to a user terminal, and the method includes: when an operation of dragging a playing progress bar is detected, determining a playback time parameter according to the operation of dragging the playback progress bar, and forming a playing request including the playback time parameter and a first playing address; sending the playing request to an edge server in a content delivery network (CDN) to make the edge server form a second playing address according to current system time parameter, the playback time parameter, and the first playing address; receiving live broadcast content corresponding to the second playing address sent by the edge server.

In order to achieve the above objectives, the present application further provides a playback system of live broadcast content, and the system includes a user terminal, an edge server in a content delivery network (CDN), a streaming media server and an origin server; wherein, the user terminal, is for when an operation of dragging a playing progress bar is detected, determining a playback time parameter according to the operation of dragging the playback progress bar, and forming a playing request including the playback time parameter and a first playing address; sending the playing request to an edge server in the CDN to make the edge server form a second playing address according to current system time parameter, the playback time parameter, and the first playing address; receiving live broadcast content corresponding to the second playing address sent by the edge server;

the edge server, is for receiving a playing request sent by a user terminal; wherein the playing request includes a first playing address and a playback time parameter; obtaining a current system time parameter, and forming a second playing address according to the current system time parameter, the first playing address and the playback time parameter; obtaining live broadcast content corresponding to the second playing address, and sending the live broadcast content to the user terminal; the streaming media server, is for receiving a live streaming pushed by an anchor terminal, and providing the live streaming to the origin server through a long link; the origin server, is for generating a video segment file and a segment index file according to the live streaming, adding a current system time parameter to a file name of the segment index file, and storing the video segment file and the segment index file.

In order to achieve the above objectives, the present application further provides a computing device, which includes a memory, a processor, and computer programs that stored in the memory and operable on the processor, when the computer programs are executed by the processor to implement steps of the playback method of live broadcast content described above.

In order to achieve the above objectives, the present application further provides a computer readable storage medium, which stores computer programs that upon execution by at least one processors cause the at least one processors to implement steps of the playback method of live broadcast content described above.

For the playback method, the system, the device, and the readable storage medium of live broadcast content provided by the present application, the user terminal adds the playback time parameter to the playing request for the edge server to determine whether a user needs to playback the live broadcast content; when the user needs to playback the live broadcast content, the edge server calculates the absolute time parameter according to the playback time parameter and the current system time parameter, thereby the first playing address is converted into the second playing address containing the absolute time parameter, and finally the corresponding live broadcast content is obtained according to the second playing address, so as to achieve the effect of playing back the previous live broadcast content.

BRIEF DESCRIPTION OF THE DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the present application. Also, throughout the drawings, the same reference symbols are used to denote the same components. In the attached drawings.

DETAILED DESCRIPTION OF ILLUSTRATIVE EMBODIMENTS

In order to make the objectives, technical solutions, and advantages of the present application clearer, the following further describes the present application in detail with reference to the accompanying drawings and embodiments. It should be understood that the specific embodiments described here are only used to explain the present application, but not used to limit the present application. Based on the embodiments in the present application, all other embodiments obtained by those of ordinary skill in the art without creative work shall fall within the protection scope of the present application.

First Embodiment

Figure 1:
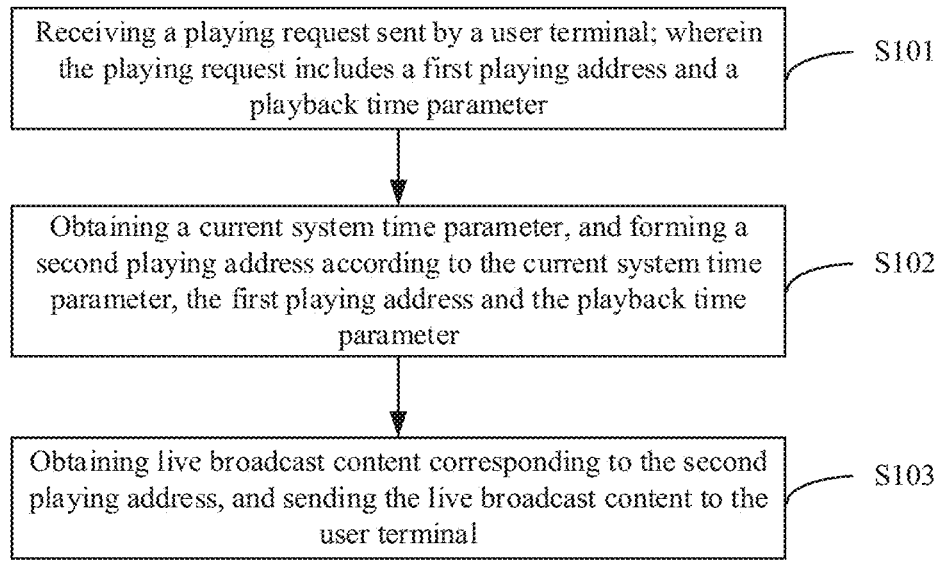
FIG. 1 is a flowchart of a playback method of live broadcast content provided in the first embodiment.

The embodiment of the present application provides a playback method of live broadcast content, applied to an edge server in a content delivery network (CDN). Wherein, the CDN is an intelligent virtual network built on the basis of the existing network. Relying on edge servers deployed in various places, the CDN enables user terminals to obtain required live broadcast content nearby through load balancing, content delivery, scheduling and other functional modules of a central platform. As shown in FIG. 1, the method specifically includes the following steps:

Step S101, receiving a playing request sent by a user terminal (i.e., a client computing device); wherein the playing request includes a first playing address and a playback time parameter.

It should be noted that the technical solution provided by the embodiment uses an Http Live Streaming (HLS) protocol as a carrier, so that the user may pull a playing progress bar at any time while watching the live broadcast to watch previous live broadcast content.

HLS is a streaming media transmission protocol based on HyperText Transfer Protocol (http), the biggest advantage of HLS is that Hyper Text Markup Language (HTML5) can be opened and played directly, which means that a live link can be forwarded through a social software, without the need to install any independent application (APP), a user can directly play a live broadcast video according to the live link through a browser. Therefore, in the embodiment, the playing request is an http request that can be opened in an HTML5 page.

The basic working principle of HLS is: when a collecting and pushing streaming end (that is, an anchor terminal) pushes live streaming to a streaming media server, the server buffers the live streaming for a period of time and packages it into a new video segment file. At the same time, the server creates an m3u8 segment index file to maintain the index information of the latest several video segment files. When a playing end (that is, the user terminal) obtains the live broadcast video, the playing end obtains the latest video segment file through the m3u8 segment index file and plays the latest video segment file, so as to ensure that the user watches the newer live broadcast content whenever being connected, thereby achieving a live broadcast experience. The old version of HLS uses TS to store video segment files, and the new version of HLS uses fragmented MP4 (ie, FMP4) to store the video segment files.

In the embodiment, when the user wants to watch a target live broadcast through the browser installed on the user terminal, the first playing address is sent to the edge server by the user terminal; wherein, the first playing address is address information used to obtain the segment index file of the target live broadcast.

Specifically, the playback time parameter presents for length of time that needs to be played back, and the playback time parameter may be located in QueryString parameter of the first playing address. It should be noted that in practical applications, the playback time parameter may also be used as a part of the Path in the Uniform Resource Locator (URL) of the playing request, rather than being limited to the QueryString.

In the embodiment, while the user is watching the target live broadcast, when the user wants to playback the live broadcast content, the user can drag the playing progress bar under a player in the browser to determine a playback time point, and the user terminal can determine the playback time parameter (in seconds) according to difference between a current system time point and the playback time point, that is, the playback time parameter is the number of seconds that needs to be rolled back. The user terminal then adds the playback time parameter to end of the first playing address which is used to obtain the segment index file of the target live broadcast to form the playing request. For example, when the first playing address of the m3u8 segment index file of the target live broadcast is http://xx.xx.xxx.x/21509030/index.m3u8, when the user drags the playing progress bar to watch the live broadcast content 120 seconds ago, the user terminal forms the playback time parameter "tmshift=120" through a preset javascript script, and adds the playback time parameter "tmshift=120" to the end of the first playing address to form the playback request http://xx.xx.xxx.x/21509030/index.m3u8?tmshift=120.

It should be noted that in practical applications, on one hand, a script file can be added to the user terminal in advance to calculate the playback time parameter through the script file according to the user's operation of dragging the playing progress bar, thereby forming the playing request; on the other hand, the user may also directly enter the first playing address added with the playback time parameter in the browser to realize the function of video playback.

Further, after receiving the playing request sent by the user terminal, the method further includes:
determining whether the playback time parameter is included in the playing request;
if not, setting the playback time parameter to be zero.

In the embodiment, when the user normally watches the live broadcast and does not need to playback the live broadcast content, the user terminal does not add the playback time parameter to the playing request. Only when the user drags the playing progress bar, the user terminal adds the playback time parameter to the playing request. When it is determined that the playback time parameter is not included in the playing request, the value of the playback time parameter is set to zero to facilitate the implementation of subsequent steps.

It should be noted that in practical applications, when it is determined that the playback time parameter is not included in the playback request, traditional CDN back-to-source solution can also be used to obtain the segment index file.

Step S102, obtaining a current system time parameter, and forming a second playing address according to the current system time parameter, the first playing address and the playback time parameter.

Specifically, Step S102 includes:
taking difference between the current system time parameter and the playback time parameter as an absolute time parameter, and forming the second playing address including the absolute time parameter and the first playing address.

For example, when the current system time parameter is 1457814 (unit is second), if the playback time parameter is not added to the playing request, the playback time parameter is 0 and the absolute time parameter is 1457814; if the playback time parameter which is 120 is added to the playing request, the absolute time parameter is 1457694 (1457814−120=1457694).

In the embodiment, the absolute time parameter is included in the second playing address. For example, if the first playing address is: http://xx.xx.xxx.x/21509030/index.m3u8?tmshift=120, the current system time parameter is 1457814, then the playback time parameter is 120, the absolute time parameter is 1457694, and the formed second playing address is: http://xx.xx.xxx.x/21509030/1457694.m3u8. For another example, if the first playing address is: http://xx.xx.xxx.x/21509030/index.m3u8 and the current system time parameter is 1457814, then the playback time parameter is 0, the absolute time parameter is 1457814, and the formed second playing address is: http://xx.xx.xxx.x/21509030/1457814.m3u8.

Step S103, obtaining live broadcast content corresponding to the second playing address, and sending the live broadcast content to the user terminal.

Specifically, Step S103 includes:
Step A1, obtaining a segment index file corresponding to the second playing address, and sending the segment index file to the user terminal; wherein the segment index file includes index information of a plurality of video segment files.

Step A2, receiving a segmentation request sent by the user terminal; wherein the segmentation request includes index information.

Preferably, the index information is a file name of a video segment file.

Step A3, obtaining the video segment file corresponding to the index information, and sending the video segment file to the user terminal.

Further, Step A1 includes:
determining whether the segment index file corresponding to the second playing address is existed in a local cache;
if yes, sending the segment index file in the local cache to the user terminal;
if not, obtaining the segment index file corresponding to the second playing address from an origin server in the CDN, storing the segment index file in the local cache and sending the segment index file to the user terminal.

In the embodiment, when a plurality of user terminals request to play the same target live broadcast, the edge server may only obtain the segment index file of the target live broadcast from the origin server once, and store the segment index file in the local cache (such as cache), and then deliver the segment index files in the local cache to the plurality of the user terminals, thereby reducing the burden of the origin server.

It should be noted that the second playing address is real address information of the target live broadcast used for obtaining the segment index file.

Furthermore, the obtaining the segment index file corresponding to the second playing address, specifically includes:

parsing out the absolute time parameter contained in the second playing address;

obtaining the segment index file whose file name includes the absolute time parameter.

In the embodiment, in order to be convenient to obtain the segment index file, the origin server adds the current system time parameter to the file name of the segment index file when generating the segment index file. Then, the corresponding segment index file can be found according to whether the file name includes the absolute time parameter in the second playing address.

Furthermore, the step A3 specifically includes:

determining whether the video segment file corresponding to the index information is existed in a local cache;

if yes, sending the video segment file in the local cache to the user terminal;

if not, obtaining the video segment file corresponding to the index information from an origin server in the CDN, storing the video segment file in the local cache and sending the video segment file to the user terminal.

Similarly, in the embodiment, when a plurality of user terminals request to play the same target live broadcast, the edge server may only obtain the segment index file of the target live broadcast from the origin server once, and store the segment index file in the local cache (such as cache), and then deliver the segment index files in the local cache to the plurality of the user terminals, thereby reducing the burden of the origin server.

It should be noted that in practical applications, when the user watches live broadcast content through the user terminal, the user terminal periodically sends the playing request to the edge server at a preset time interval. Preferably, the user terminal sends the playing request including the first playing address to the edge server every second. When the user does not need to playback the live broadcast content, the playing request does not include the playback time parameter, and the edge server generates the second playing address according to the current system time parameter, so as to obtain the live broadcast content according to the second playing address. Because the second playing address includes the current time parameter, so the obtained live broadcast content is also the current latest live broadcast content. The following example illustrates:

Step B1, the current system time parameter 145817 is obtained.

Step B2, when the user enters a live room to watch the live broadcast content, the user terminal sends the playing request including the first playing address to the edge server; wherein the first playing address is: http://xx.xx.xxx.x/21509030/index.m3u8, the playback time parameter is not included.

Step B3, the edge server calculates the absolute time parameter 145817 according to the current system time parameter 145817 and the playback time parameter 0, and generates the second playing address: http://xx.xx.xxx.x/21509030/145817.m3u8.

Step B4, the edge server determines whether the segment index file corresponding to the second playing address is existed in the local cache, if yes, the segment index file is directly returned to the user terminal, if not, the segment index file is obtained from the origin server, and returns to the user terminal after being stored in the local cache.

Step B5, the user terminal then downloads the video segment file from the edge server according to a list in the segment index file for playing.

Step B6, after 1 second, the current system time parameter 145818 is obtained.

Step B7, the user terminal continues to send the playing request including the first playing address to the edge server; wherein, the first playing address is: http://xx.xx.xxx.x/21509030/index.m3u8.

Step B8, the edge server calculates the absolute time parameter 145818 according to the current system time parameter 145818 and the playback time parameter 0, and generates the second playing address: http://xx.xx.xxx.x/21509030/145818.m3u8.

Step B9, steps B4 to B8 are repeated.

In addition, when the user needs to playback live broadcast content, the playback time parameter is included in the playing request, and the edge server will generate the second playing address according to the current system time parameter and playback time parameter, so as to obtain the live broadcast content according to the second playing address. It should be noted that, the user terminal will use a fixed first playing address, but because the current system time parameter changes with each request, so the second playing address calculated is different each time. On the basis of the above steps B1 to B9, when the user needs to playback the live broadcast content, the following example illustrates:

Step C1, the current system time parameter 145817 is obtained.

Step C2, the user terminal detects the user's operation of dragging the playing progress bar, and determines the playback time parameter to be 100 according to the operation of dragging the playback progress bar; that is, the user drags the progress back for 100 seconds.

Step C3, the user terminal generates the playing request according to the playback time parameter and the first playing address: http://xx.xx.xxx.x/21509030/index.m3u8?tmshift=100, and sends the playing request including the first playing address and the playback time parameter to the edge server.

Step C4, the edge server calculates the absolute time parameter 145717 according to the current system time parameter 145917 and the playback time parameter 100, and generates the second playing address: http://xx.xx.xxx.x/21509030/145717.m3u8.

Step C5, since the segment index file corresponding to http://xx.xx.xxx.x/21509030/145717.m3u8 has been cached in the local cache in the above step B4, the corresponding segment index file is directly obtained from the cache and returned to the user terminal, and there is no need to perform the back-to-origin operation on the origin server.

Step C6, the user terminal then downloads the video segment file from the edge server according to the list in the segment index file for playing. It should be noted that, since the video segment file has been cached in the local cache in the above step B5, the corresponding video segment file is directly obtained from the cache and returned to the user terminal, and there is no need to perform the back-to-origin operation on the origin server.

Step C7, after 1 second, the current system time parameter 145918 is obtained.

Step C8, the user terminal sends the playing request including the first playing address and the playback time parameter to the edge server; wherein, the first playing address is also: http://xx.xx.xxx.x/21509030/index.m3u8.

Step C9, the edge server calculates the absolute time parameter 145818 according to the current system time parameter 145918 and the playback time parameter 100, and generates the second playing address: http://xx.xx.xxx.x/21509030/145818.m3u8.

Step C10, steps C5 to C9 are repeated.

It can be seen that in the embodiment, the origin server only needs to deliver the latest segment index file and video segment file to the edge server for the edge server to cache; when the user needs to playback the live broadcast content, the corresponding segment index file and video segment file can be directly obtained from the edge server, and there is no need to perform the back-to-origin operation on the origin server, thereby reducing the back-to-source pressure of the origin server.

In the prior art, the edge server needs to continuously obtain the latest segment index file and video segment file from the origin server, and can only cache the segment index file for a short time (for example, 1 second). However, in the embodiment, the edge server caches the segment index file and the video segment file for a long time for playback of the live broadcast content. Because the edge server calculates the absolute time parameter according to the current system time parameter and the playback time parameter, therefore, a dynamic segment index file and a dynamic video segment file that cannot be cached for a long time can be converted into a static segment index file and a static video segment file that can be cached for a long time, which greatly reduces the number of back-to-source.

Second Embodiment

Figure 2:
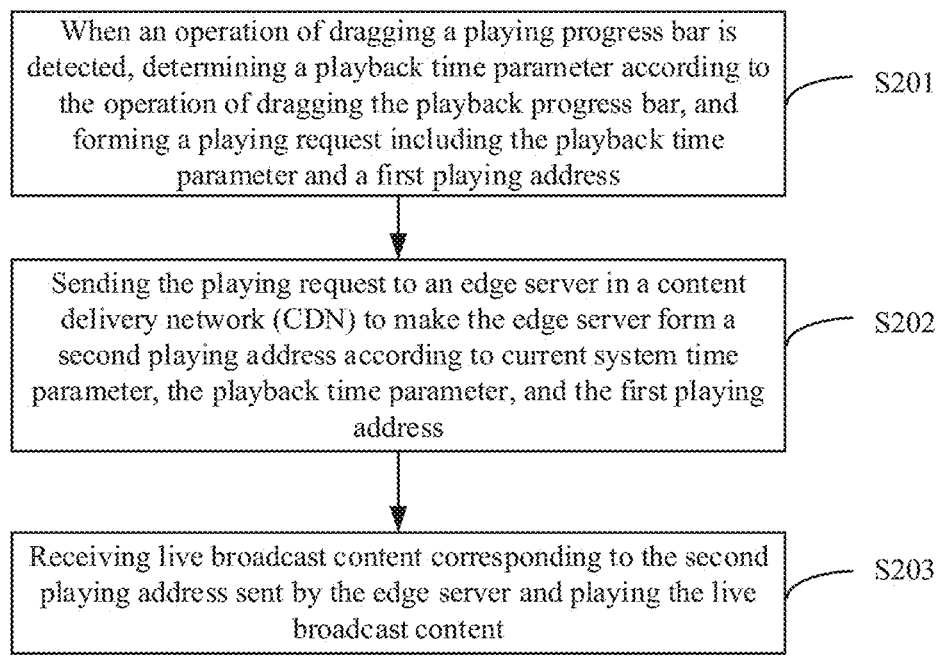
FIG. 2 is another flowchart of a playback method of live broadcast content provided in the second embodiment.

The embodiment of the present application provides a playback method of live broadcast content applied to a user terminal. As shown in FIG. 2, the method specifically includes the following steps:

S201, when an operation of dragging a playing progress bar is detected, determining a playback time parameter according to the operation of dragging the playback progress bar, and forming a playing request including the playback time parameter and a first playing address.

S202, sending the playing request to an edge server in a content delivery network (CDN) to make the edge server form a second playing address according to current system time parameter, the playback time parameter, and the first playing address.

S203, receiving live broadcast content corresponding to the second playing address sent by the edge server and playing the live broadcast content.

Specifically, the playing request is an http request that can be opened on an HTML5 page.

Further, the step S201 specifically includes:

determining the playback time parameter based on difference between the current system time point and the playback time point;

adding the playback time parameter to an end of the first playing address to form the playing request.

In the embodiment, while the user is watching the target live broadcast, when the user wants to playback the live broadcast content, the user can drag the playing progress bar under a player in the browser to determine a playback time point, and the user terminal can determine the playback time parameter (in seconds) according to difference between a current system time point and the playback time point, that is, the playback time parameter is the number of seconds that needs to be rolled back. The user terminal then adds the playback time parameter to the end of the first playing address which is used to obtain the segment index file of the target live broadcast to form the playing request.

Further, the method further includes:

when the operation of dragging a playing progress bar is not detected, sending the playing request including the first playing address to the edge server.

Furthermore, the step S203 includes:

Step A1, receiving a segment index file corresponding to the second playing address sent by the edge server, wherein the segment index file includes index information of a plurality of video segment files.

Step A2, sending a segmentation request to the edge server; wherein the segmentation request includes index information.

Step A3, receiving the video segment file corresponding to the index information sent by the edge server.

Step A4, playing the video segment file.

Third Embodiment

Figure 3:
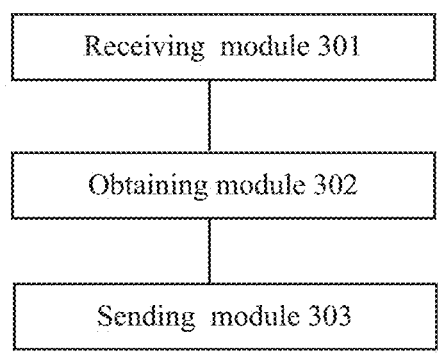
FIG. 3 is a schematic diagram of a structure of a playback device of live broadcast content provided in the third embodiment.

The embodiment of the present application provides a playback device of live broadcast content, applied to an edge server in a content delivery network (CDN). As shown in FIG. 3, the device specifically includes the following components:

a receiving module 301, receiving a playing request sent by a user terminal; wherein the playing request includes a first playing address and a playback time parameter;

an obtaining module 302, obtaining a current system time parameter, and forming a second playing address according to the current system time parameter, the first playing address and the playback time parameter.

a sending module 303, obtaining live broadcast content corresponding to the second playing address, and sending the live broadcast content to the user terminal.

Specifically, the playing request is an http request that can be opened on an HTML5 page.

Further, the receiving module 301 is also for:

determining whether the playback time parameter is included in the playing request; if not, setting the playback time parameter to be zero.

The obtaining module 302 is specifically for:

taking difference between the current system time parameter and the playback time parameter as an absolute time parameter, and forming the second playing address including the absolute time parameter and the first playing address.

The sending module 303 specifically includes:

an obtaining unit, obtaining a segment index file corresponding to the second playing address, and sending the segment index file to the user terminal; wherein the segment index file includes index information of a plurality of video segment files.

a receiving unit, receiving a segmentation request sent by the user terminal; wherein the segmentation request includes index information.

a sending unit, obtaining the video segment file corresponding to the index information, and sending the video segment file to the user terminal.

Further, the obtaining unit is specifically for:

determining whether the segment index file corresponding to the second playing address is existed in a local cache;

if yes, sending the segment index file in the local cache to the user terminal;

if not, obtaining the segment index file corresponding to the second playing address from a origin server in the CDN, storing the segment index file in the local cache and sending the segment index file to the user terminal.

Further, the sending unit is specifically for:

determining whether the video segment file corresponding to the index information is existed in a local cache;

if yes, sending the video segment file in the local cache to the user terminal;

if not, obtaining the video segment file corresponding to the index information from a origin server in the CDN, storing the video segment file in the local cache and sending the video segment file to the user terminal.

Furthermore, when implementing the step of obtaining the segment index file corresponding to the second playing address, the sending module 303 is specifically for:

parsing out the absolute time parameter included in the second playing address; and obtaining the segment index file whose file name includes the absolute time parameter.

Fourth Embodiment

Figure 4:
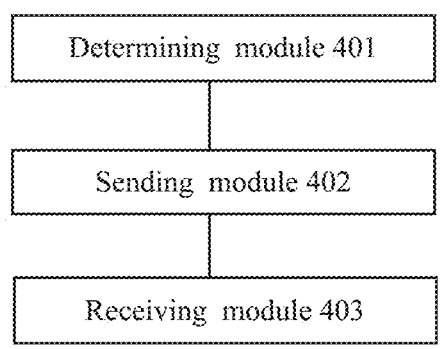
FIG. 4 is another schematic diagram of a structure of a playback device of live broadcast content provided in the fourth embodiment.

The embodiment of the present application provides a playback device of live broadcast content applied to a user terminal. As shown in FIG. 4, the device specifically includes the following components:

a determining module 401, when an operation of dragging a playing progress bar is detected, determining a playback time parameter according to the operation of dragging the playback progress bar, and forming a playing request including the playback time parameter and a first playing address;

a sending module 402, sending the playing request to an edge server in a content delivery network (CDN) to make the edge server form a second playing address according to current system time parameter, the playback time parameter, and the first playing address;

a receiving module 403, receiving live broadcast content corresponding to the second playing address sent by the edge server and playing the live broadcast content.

Specifically, the playing request is an http request that can be opened on an HTML5 page.

Further, the determining module 401 is specifically for:

determining the playback time parameter based on difference between a current system time point and a playback time point; adding the playback time parameter to an end of the first playing address to form the playing request.

Further, the determining module 401 is also for:

when the operation of dragging a playing progress bar is not detected, sending the playing request including the first playing address to the edge server.

Further, the receiving module 403 is specifically for:

receiving a segment index file corresponding to the second playing address sent by the edge server, wherein the segment index file includes index information of a plurality of video segment files; sending a segmentation request to the edge server; wherein the segmentation request includes index information; receiving the video segment file corresponding to the index information sent by the edge server; playing the video segment file.

Fifth Embodiment

Figure 5:
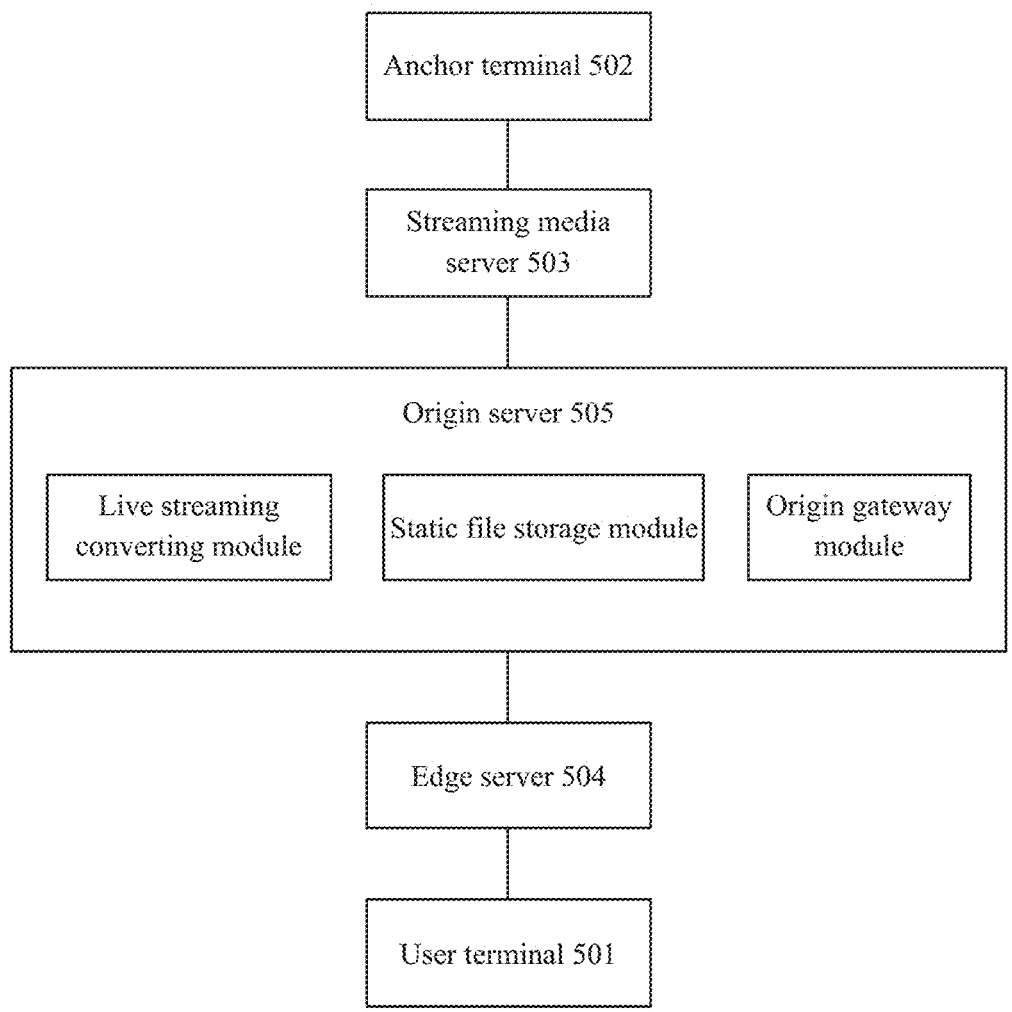
FIG. 5 is a schematic diagram of a structure of a playback system of live broadcast content provided in the fifth embodiment.

The embodiment of the present application provides a playback system of live broadcast content. As shown in FIG. 5, the system specifically includes the following components: a user terminal 501, an anchor terminal 502, a streaming media server 503, and an edge server 504 in a content delivery network (CDN) and an origin server 505, the functions implemented by each component are specifically introduced as follows:

(1) the user terminal 501 is for when an operation of dragging a playing progress bar is detected, determining a playback time parameter according to the operation of dragging the playback progress bar, and forming a playing request including the playback time parameter and a first playing address; sending the playing request to an edge server in the CDN to make the edge server form a second playing address according to current system time parameter, the playback time parameter and the first playing address; receiving live broadcast content corresponding to the second playing address sent by the edge server and playing the live broadcast content.

In the embodiment, a browser for watching live video is installed on the user terminal, and the browser is compatible with the standard HLS protocol, that is, the browser can directly use a video tag for watching.

In the embodiment, while the user is watching the target live broadcast, when the user wants to playback the live broadcast content, the user can drag the playing progress bar under a player in the browser to determine a playback time point, and the user terminal can determine the playback time parameter (in seconds) according to difference between a current system time point and the playback time point, that is, the playback time parameter is the number of seconds that needs to be rolled back. The user terminal then adds the playback time parameter to end of the first playing address which is used to obtain the segment index file of the target live broadcast to form the playing request. For example, when the first playing address of the m3u8 segment index file of the target live streaming is "http://xx.xx.xxx.x/21509030/index.m3u8", when the user drags the playing progress bar to watch the live broadcast content 120 seconds ago, the user terminal forms the playback time parameter "tmshift=120" through a preset javascript script, and adds the playback time parameter "tmshift=120" to the end of the first playing address to form the playback request "http://xx.xx.xxx.x/21509030/index.m3u8?tmshift=120".

(2) the streaming media server 503 is for receiving a live streaming pushed by the anchor terminal, and providing the live streaming to the origin server through a long link.

In the embodiment, the streaming media server is mainly responsible for receiving the live streaming pushed by the anchor terminal through a live software using Real Time Messaging Protocol (RTMP), and provides the live streaming in FLASH VIDEO (FLV) format provided in the form of a long link to the outside for use by a Flash player.

In the practical applications, it may be that the streaming media server pushes the live streaming to the origin server actively, or the origin server pulls the live streaming from the streaming media server, and both directions can be supported.

In the embodiment, the streaming media server needs to have the ability to receive RTMP protocol push streaming and provide the long link pull streaming.

(3) the edge server 504, is for receiving a playing request sent by a user terminal; wherein the playing request includes a first playing address and a playback time parameter; obtaining a current system time parameter, and forming a second playing address according to the current system time parameter, the first playing address and the playback time parameter; obtaining live broadcast content corresponding to the second playing address, and sending the live broadcast content to the user terminal.

For the specific functions of the edge server, the first embodiment can be referred to, and the embodiment will not be repeated here.

(4) the origin server 505 is for generating a video segment file and a segment index file according to the live streaming, adding a current system time parameter to a file name of the segment index file, and storing the video segment file and the segment index file.

Specifically, the origin server includes a live streaming converting module, a static file storage module, and an origin gateway module.

Figure 6:
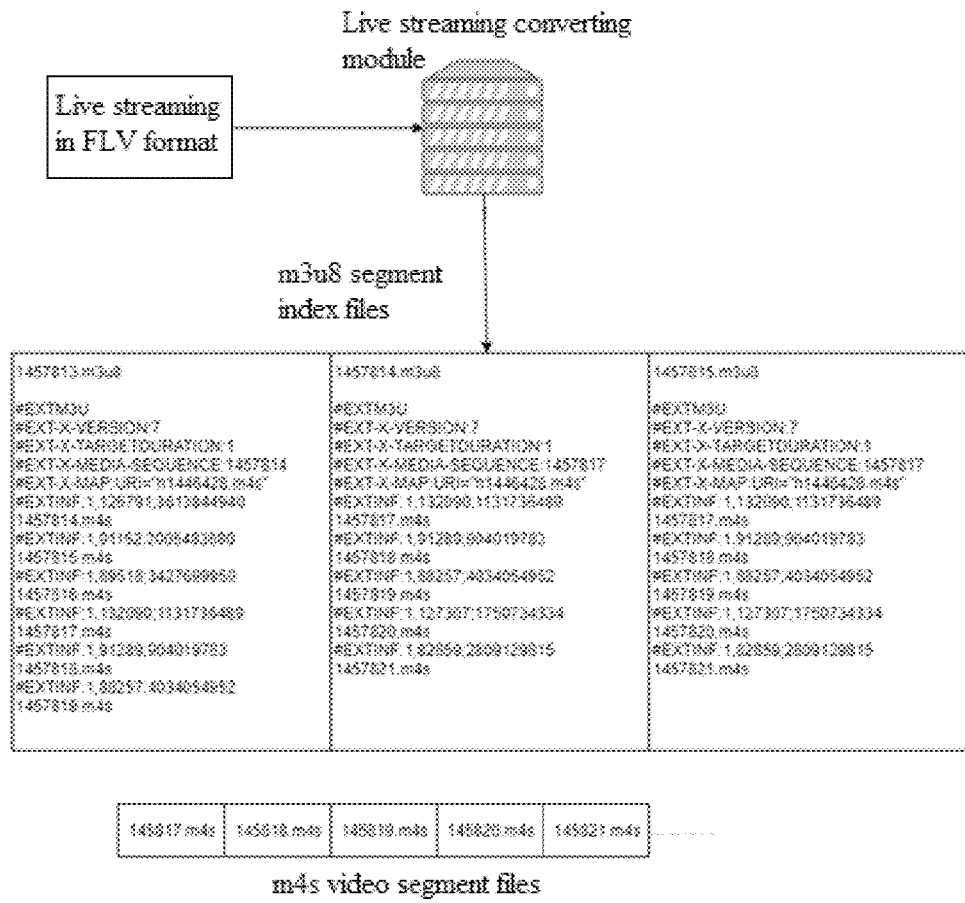
FIG. 6 is a schematic diagram of a live streaming converting module provided in the fifth embodiment generating a video segment file and a segment index file according to a live streaming.

Wherein, the live streaming converting module is for converting the live streaming in FLU format into an HLS streaming. As shown in FIG. 6, the live streaming converting module generates five m4s video segment files and three m3u8 segment index files according to the live streaming. The m4s video segment files are referenced by the m3u8 segment index files.

In the embodiment, the video segment files and segment index files generated by the live streaming converting module have the following characteristics: First, the current system time parameter is taken as the file name of the segment index file.

Second, regardless of whether the segment index file is updated or not, one segment index file is generated every second.

Third, in each segment index file, the first video frame and the first audio frame of the first video segment file are key frames, and the first video frame and the first audio frame of the subsequent video segment files do not have to be the key frames.

The static file storage module, is for storing the video segment file and segment index file, and providing download services of the video segment file and segment index file for the origin gateway module.

The origin gateway module, is for sending the video segment file and the segment index file to the edge node server.

It should be noted that in practical applications, origin server clusters can be used. When origin server clusters are adopted, the live streaming converting module, the static file storage module and the origin gateway module can be deployed on different servers or deployed on the same server.

Sixth Embodiment

Figure 7:
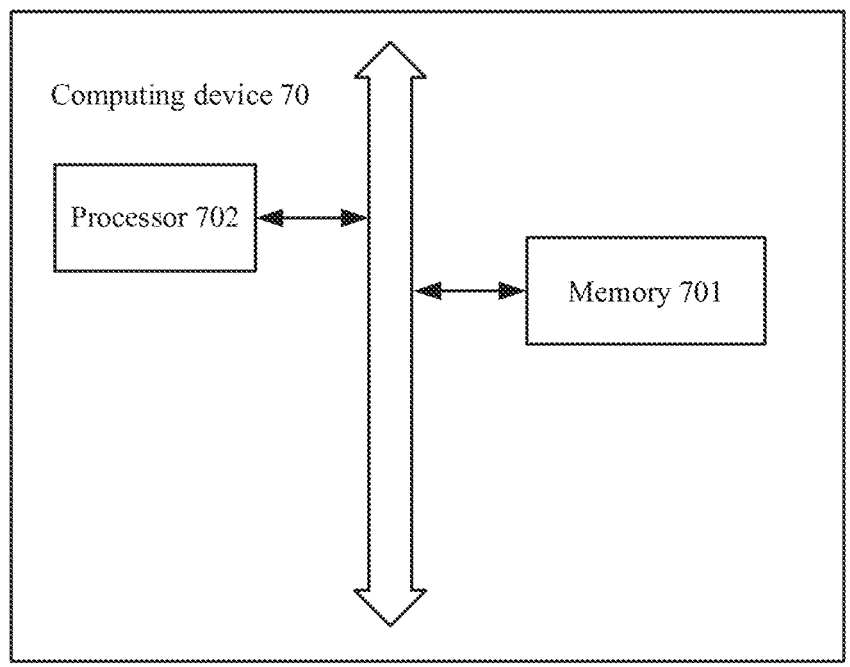
FIG. 7 is a schematic diagram of hardware architecture of a computing device provided in the sixth embodiment.

The embodiment also provides a computing device, such as a smart phone, a tablet computer, a notebook computer, a desktop computer, a rack server, a blade server, a tower server or a cabinet server (which includes independent servers, or a server cluster composed of a plurality of servers), etc. As shown in FIG. 7, the computing device 70 of the embodiment at least includes but is not limited to: a memory 701 and a processor 702 that can be communicatively connected to each other through a system bus. It should be pointed out that FIG. 7 only shows the computing device 70 with components 701-702, but it should be understood that it is not required to implement all the illustrated components, and more or fewer components may be implemented instead.

In the embodiment, the memory 701 (which is readable storage medium) includes a flash memory, a hard disk, a multimedia card, a card-type memory (for example, SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, magnetic disks, optical disks and so on. In some embodiments, the memory 701 may be an internal storage unit of the computing device 70, such as a hard disk or memory of the computing device 70. In other embodiments, the memory 701 may also be an external storage device of the computing device 70, such as a plug-in hard disk, a Smart Memory Card (SMC), and a Secure Digital (SD) card, a Flash Card and so on. Of course, the memory 701 may also include both the internal storage unit of the computing device 70 and the external storage device thereof. In the embodiment, the memory 701 is generally used to store the operating system and various application software installed in the computing device 70. In addition, the memory 701 can also be used to temporarily store various types of data that have been output or will be output.

In some embodiments, the processor 702 may be a Central Processing Unit (CPU), a controller, a microcontroller, a microprocessor, or other data processing chips. The processor 702 is generally used to control the overall operation of the computing device 70.

Specifically, in the embodiment, the processor 702 is configured to execute the programs of the playback method of live broadcast content stored in the memory 701, and the following steps are implemented when the programs of the playback method of live broadcast content are executed:

receiving a playing request sent by a user terminal; wherein the playing request includes a first playing address and a playback time parameter;

obtaining a current system time parameter, and forming a second playing address according to the current system time parameter, the first playing address and the playback time parameter;

obtaining live broadcast content corresponding to the second playing address, and sending the live broadcast content to the user terminal.

For the process of specific embodiments of the above method steps, please refer to the first embodiment, and the embodiment will not be repeated here.

Further, in the embodiment, the processor 702 is also configured to execute the programs of the playback method of live broadcast content stored in the memory 701, and the following steps are implemented when the programs of the playback method of live broadcast content are executed:

when an operation of dragging a playing progress bar is detected, determining a playback time parameter according to the operation of dragging the playback progress bar, and forming a playing request including the playback time parameter and a first playing address;

sending the playing request to an edge server in a content delivery network (CDN) to make the edge server form a second playing address according to current system time parameter, the playback time parameter, and the first playing address;

receiving live broadcast content corresponding to the second playing address sent by the edge server.

For the process of specific embodiments of the above method steps, please refer to the second embodiment, and the embodiment will not be repeated here.

Seventh Embodiment

The embodiment also provides a computer readable storage medium, such as a flash memory, a hard disk, a multimedia card, a card-type memory (for example, SD or DX memory, etc.), a Random Access Memory (RAM), a Static Random Access Memory (SRAM), an Only Read Memory (ROM), an Electrically Erasable Programmable Read-Only Memory (EEPROM), a Programmable Read-Only Memory (PROM), a magnetic memory, magnetic disks, optical disks, servers, App application malls, and so on, on which computer programs are stored, when the computer programs are executed by the processor, the following method steps are implemented:

receiving a playing request sent by a user terminal; wherein the playing request includes a first playing address and a playback time parameter;

obtaining a current system time parameter, and forming a second playing address according to the current system time parameter, the first playing address and the playback time parameter;

obtaining live broadcast content corresponding to the second playing address, and sending the live broadcast content to the user terminal.

Further, when the computer programs are executed by the processor, the following method steps are also implemented: when an operation of dragging a playing progress bar is detected, determining a playback time parameter according to the operation of dragging the playback progress bar, and forming a playing request including the playback time parameter and a first playing address; sending the playing request to an edge server in a content delivery network (CDN) to make the edge server form a second playing address according to current system time parameter, the playback time parameter, and the first playing address; receiving live broadcast content corresponding to the second playing address sent by the edge server.

For the process of specific embodiments of the above method steps, please refer to the second embodiment, and the embodiment will not be repeated here.

It should be noted that in this article, the terms "include", "comprise" or any other variants thereof are intended to cover non-exclusive inclusion, so that a process, method, article or device including a series of elements not only includes those elements, It also includes other elements that are not explicitly listed, or elements inherent to the process, method, article, or device. If there are no more restrictions, the element defined by the sentence "including a . . . " does not exclude the existence of other identical elements in the process, method, article, or device that includes the element.

The serial numbers of the foregoing embodiments of the present application are only for description, and do not represent the superiority or inferiority of the embodiments.

Through the description of the above embodiments, those skilled in the art can clearly understand that the method of the above embodiments can be implemented by means of software plus the necessary general hardware platform. Of course, it can also be implemented by hardware, but in many cases the former is better.

The above are only the preferred embodiments of the present application, and do not limit the scope of this application. Any equivalent structure or equivalent process transformation made using the content of the description and drawings of the present application, or directly or indirectly used in other related technical fields, the same reason is included in the scope of patent protection of the present application.

What is claimed is:

1. A method for playback of live broadcast content, applied to an edge server computing device in a content delivery network (CDN), the method comprising:
   receiving a request of playing live broadcast content from a client computing device, wherein the request comprises information indicating a first address associated with the live broadcast content, and the request further comprises a playback time parameter indicating a playback time length;
   generating a second address based on a current system time parameter, the first address, and the playback time parameter; and
   obtaining live broadcast content based on the second address and transmitting the live broadcast content to the client computing device, wherein the obtaining live broadcast content based on the second address and transmitting the live broadcast content to the client computing device further comprises:
   obtaining a segment index file based on the second address and sending the segment index file to the client computing device, wherein the segment index file comprises index information associated with a plurality of video segments of the live broadcast content, and wherein the obtaining a segment index file based on the second address further comprises:
   parsing the second address comprising the absolute time parameter, and
   identifying the segment index file based on determining that a file name of the segment index file contains the absolute time parameter.

2. The method of claim 1, further comprising:
   in response to determining that the request does not comprise the playback time length, setting the playback time parameter as zero.

3. The method of claim 1, wherein the generating a second address based on a current system time parameter, the first address and the playback time parameter further comprises:
   determining an absolute time parameter based on a difference between the current system time parameter and the playback time parameter; and
   generating the second address based on the absolute time parameter and the first address.

4. The method of claim 1, wherein the obtaining live broadcast content based on the second address and transmitting the live broadcast content to the client computing device further comprises:
   receiving a request for at least one video segment among the plurality of video segments from the client computing device, wherein the request comprises index information associated with the at least one video segment;
   obtaining the at least one video segment based on the index information associated with the at least one video segment; and
   sending the at least one video segment to the client computing device.

5. The method of claim 1, further comprising:
   determining whether the segment index file exists in a local cache; and
   in response to determining that the segment index file does not exist in the local cache, obtaining the segment index file from an origin server computing device in the CDN.

6. The method of claim 4, further comprising:
   determining whether the at least one video segment exists in a local cache;
   in response to determining that the at least one video segment exists in the local cache, sending the at least one video segment in the local cache to the client computing device for display of the at least one video segment; and
   in response to determining that the at least one video segment does not exist in the local cache, obtaining the at least one video segment from an origin server computing device in the CDN.

7. A system, comprising:
at least one processor; and
at least one memory communicatively coupled to the at least one processor and comprising computer-readable instructions that upon execution by the at least one processor cause the at least one processor to perform operations comprising:
receiving a request of playing live broadcast content from a client computing device, wherein the request comprises information indicating a first address associated with the live broadcast content, and the request further comprises a playback time parameter indicating a playback time length;
generating a second address based on a current system time parameter, the first address, and the playback time parameter; and
obtaining live broadcast content based on the second address and transmitting the live broadcast content to the client computing device, wherein the obtaining live broadcast content based on the second address and transmitting the live broadcast content to the client computing device further comprises:
obtaining a segment index file based on the second address and sending the segment index file to the client computing device, wherein the segment index file comprises index information associated with a plurality of video segments of the live broadcast content, and wherein the obtaining a segment index file based on the second address further comprises:
parsing the second address comprising the absolute time parameter, and
identifying the segment index file based on determining that a file name of the segment index file contains the absolute time parameter.

8. The system of claim 7, the operations further comprising:
in response to determining that the request does not comprise the playback time length, setting the playback time parameter as zero.

9. The system of claim 7, wherein the generating a second address based on a current system time parameter, the first address and the playback time parameter further comprises:
determining an absolute time parameter based on a difference between the current system time parameter and the playback time parameter; and
generating the second address based on the absolute time parameter and the first address.

10. The system of claim 7, wherein the obtaining live broadcast content based on the second address and transmitting the live broadcast content to the client computing device further comprises:
receiving a request for at least one video segment among the plurality of video segments from the client computing device, wherein the request comprises index information associated with the at least one video segment;
obtaining the at least one video segment based on the index information associated with the at least one video segment; and
sending the at least one video segment to the client computing device.

11. The system of claim 7, the operations further comprising:
determining whether the segment index file exists in a local cache; and
in response to determining that the segment index file does not exist in the local cache, obtaining the segment index file from an origin server computing device in the CDN.

12. The system of claim 10, the operations further comprising:
determining whether the at least one video segment exists in a local cache;
in response to determining that the at least one video segment exists in the local cache, sending the at least one video segment in the local cache to the client computing device for display of the at least one video segment; and
in response to determining that the at least one video segment does not exist in the local cache, obtaining the at least one video segment from an origin server computing device in the CDN.

13. A non-transitory computer-readable storage medium, storing computer-readable instructions that upon execution by a processor cause the processor to implement operations comprising:
receiving a request of playing live broadcast content from a client computing device, wherein the request comprises information indicating a first address associated with the live broadcast content, and the request further comprises a playback time parameter indicating a playback time length;
generating a second address based on a current system time parameter, the first address, and the playback time parameter; and
obtaining live broadcast content based on the second address and transmitting the live broadcast content to the client computing device, wherein the obtaining live broadcast content based on the second address and transmitting the live broadcast content to the client computing device further comprises:
obtaining a segment index file based on the second address and sending the segment index file to the client computing device, wherein the segment index file comprises index information associated with a plurality of video segments of the live broadcast content, and wherein the obtaining a segment index file based on the second address further comprises:
parsing the second address comprising the absolute time parameter, and
identifying the segment index file based on determining that a file name of the segment index file contains the absolute time parameter.

14. The non-transitory computer-readable storage medium of claim 13, the operations further comprising:
in response to determining that the request does not comprise the playback time length, setting the playback time parameter as zero.

15. The non-transitory computer-readable storage medium of claim 13, wherein the generating a second address based on a current system time parameter, the first address and the playback time parameter further comprises:
determining an absolute time parameter based on a difference between the current system time parameter and the playback time parameter; and
generating the second address based on the absolute time parameter and the first address.

16. The non-transitory computer-readable storage medium of claim 15, wherein the obtaining live broadcast content based on the second address and transmitting the live broadcast content to the client computing device further comprises:

receiving a request for at least one video segment among the plurality of video segments from the client computing device, wherein the request comprises index information associated with the at least one video segment;

obtaining the at least one video segment based on the index information associated with the at least one video segment; and sending the at least one video segment to the client computing device.

17. The non-transitory computer-readable storage medium of claim 16, the operations further comprising:

determining whether the at least one video segment exists in a local cache;

in response to determining that the at least one video segment exists in the local cache, sending the at least one video segment in the local cache to the client computing device for display of the at least one video segment; and in response to determining that the at least one video segment does not exist in the local cache, obtaining the at least one video segment from an origin server computing device in the CDN.

\* \* \* \* \*